(12) United States Patent
Li et al.

(10) Patent No.: US 11,261,267 B1
(45) Date of Patent: Mar. 1, 2022

(54) PHOTOCURABLE COMPOSITION

(71) Applicant: CANON KABUSHIKI KAISHA, Tokyo (JP)

(72) Inventors: Fei Li, Austin, TX (US); Weijun Liu, Cedar Park, TX (US)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/124,965

(22) Filed: Dec. 17, 2020

(51) Int. Cl.
| | |
|---|---|
| C08F 2/46 | (2006.01) |
| C08F 2/50 | (2006.01) |
| C08G 61/04 | (2006.01) |
| B05D 3/06 | (2006.01) |
| B32B 27/30 | (2006.01) |
| C08F 222/10 | (2006.01) |
| B32B 27/26 | (2006.01) |

(52) U.S. Cl.
CPC ............... *C08F 2/50* (2013.01); *B05D 3/067* (2013.01); *B32B 27/26* (2013.01); *B32B 27/308* (2013.01); *C08F 222/102* (2020.02); *C08F 222/103* (2020.02); *C08F 222/104* (2020.02)

(58) Field of Classification Search
CPC ............... C08F 2/46; C08F 2/50; C08G 61/04
USPC .................... 522/5, 1, 6, 189, 184, 71; 520/1
See application file for complete search history.

(56) References Cited

U.S. PATENT DOCUMENTS

| | | | |
|---|---|---|---|
| 6,709,271 B2 | 3/2004 | Tin | |
| 6,783,810 B2 | 8/2004 | Jin | |
| 7,601,767 B2 | 10/2009 | Ruppert | |
| 8,999,221 B2 | 4/2015 | Kodama | |
| 2011/0236595 A1* | 9/2011 | Kodama | G03F 7/0002 427/553 |
| 2014/0121292 A1* | 5/2014 | Kodama | C09D 4/00 522/64 |
| 2016/0362567 A1* | 12/2016 | Ono | C08F 220/28 |
| 2018/0215850 A1 | 8/2018 | Lee | |
| 2020/0225581 A1* | 7/2020 | Hsu | C08F 20/30 |
| 2021/0024682 A1* | 1/2021 | Suzuki | C08F 290/061 |

FOREIGN PATENT DOCUMENTS

| | | | |
|---|---|---|---|
| JP | 2014185337 | * | 10/2014 |
| JP | 5806501 B2 | | 11/2015 |
| JP | 5968933 B2 | | 8/2016 |
| JP | 2018039988 | * | 3/2018 |

OTHER PUBLICATIONS

Hattori et al, JP 2014-185337 Machine Translation, Oct. 2, 2014 (Year: 2014).*
Fuke et al, JP 2018-039988 Machine Translation, Mar. 15, 2018 (Year: 2018).*

* cited by examiner

*Primary Examiner* — Jessica Whiteley
(74) *Attorney, Agent, or Firm* — Abel Schillinger, LLP

(57) ABSTRACT

A photocurable composition can comprise a polymerizable material and a photoinitiator, wherein the polymerizable material can comprise 10-40 wt % of a mono-functional monomer of formula (1), with R1 being H or $C_1$-$C_6$ alkyl, and R2 and R3 being one or more substitutions of $C_1$-$C_{10}$ alkyl or alkyl-aryl, and R4, R5 being H or $C_1$-$C_{10}$ alkyl,

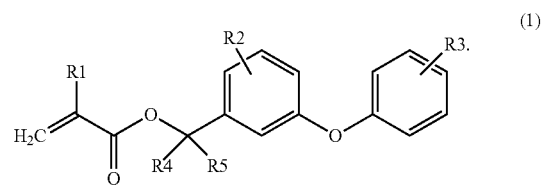

The photocurable composition can have a viscosity of not greater than 15 mPa·s, and a photo-cured layer of the photocurable composition can have a low thermal shrinkage if subjected to a high temperature baking treatment, and a carbon content of at least 74%.

20 Claims, No Drawings

PHOTOCURABLE COMPOSITION

FIELD OF THE DISCLOSURE

The present disclosure relates to a photocurable composition, particularly to a photo-curable composition for inkjet adaptive planarization adapted for forming photo-cured layers having a low thermal shrinkage during subsequent baking treatment.

BACKGROUND

Inkjet Adaptive Planarization (IAP) is a process which planarizes a surface of a substrate, e.g., a wafer containing an electric circuit, by jetting liquid drops of a photocurable composition on the surface of the substrate, and bringing a flat superstrate in direct contact with the added liquid to form a flat liquid layer. The flat liquid layer is typically solidified under UV light exposure, and after removal of the superstrate a planar polymeric surface is obtained, which can be subjected to subsequent processing steps, for example baking, etching, and/or further deposition steps.

Subsequent baking of the formed photocured layer is often conducted at a temperature above its glass transition temperature. The baking typically causes forming of a denser packing of the polymeric layer, which leads to an undesired shrinking of the layer and can be a further challenge to the planarization efficiency. Typically, the thermal shrinking during baking is larger than the shrinking during the photo-curing of the photocurable composition.

There exists a need for improved IAP materials leading to planar photo-cured layers with low shrinkage during subsequent processing.

SUMMARY

In one embodiment, a photocurable composition can comprise a photoinitiator and a polymerizable material, wherein the polymerizable material may comprise a mono-functional acrylate monomer having a structure of formula (1), with R1 being H or $C_1$-$C_6$ alkyl, and R2 and R3 being one or more substitutions of $C_1$-$C_{10}$ alkyl or alkyl-aryl, and R4, R5 being H or $C_1$-$C_{10}$ alkyl,

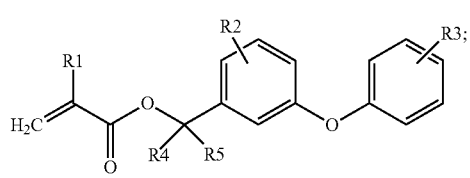

(1)

an amount of the acrylate monomer of formula (1) can be at least 10 wt % and not greater than 30 wt % based on the total weight of the polymerizable material; and a carbon content of a photo-cured layer of the photocurable composition can be at least 74%.

In one aspect, the polymerizable material can further comprise at least one multi-functional acrylate monomer. In a particular aspect, the at least one multi-functional acrylate monomer can include a bi-functional acrylate monomer, a tri-functional acrylate monomer, a tetra-functional acrylate monomer, or any combination thereof. In a certain particular aspect, the at least one multi-functional acrylate monomer can include bisphenol A dimethacrylate (BPADMA).

In another certain aspect of the photocurable composition, the amount of the multi-functional acrylate monomer can be at least 10 wt % and not greater than 30 wt % based on the total weight of the polymerizable material.

In a particular embodiment of the photocurable composition, the mono-functional acrylate monomer can have a structure of formula (2), with R1 being H or $CH_3$:

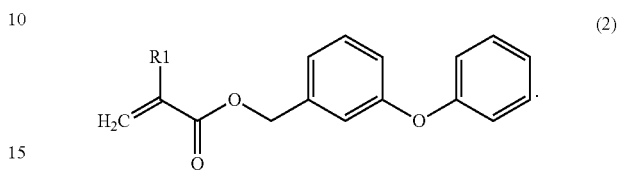

(2)

In one aspect, the amount of the mono-functional acrylate monomer of formula (2) can be not greater than 25 wt % based on the total weight of the polymerizable material.

In another aspect, the amount of the mono-functional acrylate monomer of formula (2) may be not greater than 15 wt % based on the total weight of the polymerizable material.

In a further embodiment, the photocurable composition can be adapted that a photo-cured layer of the composition has a thermal shrinkage of not greater than 7.5 percent, the thermal shrinkage being a difference in thickness of the photo-cured layer before and after being subjected to a baking treatment at 250° C. for 2 minutes.

In another aspect, the viscosity of the photocurable composition can be not greater than 15 mPa·s.

In yet a further aspect, the photocurable composition can be adapted that a photo-cured layer of the composition has an Ohnishi number not greater than 2.9.

In one embodiment, a laminate can comprise a substrate and a photo-cured layer overlying the substrate, wherein the photo-cured layer is formed from the above-described photocurable composition.

In one aspect of the laminate, the photo-cured layer can have a thermal shrinkage of not greater than 7 percent, the thermal shrinkage being a difference in thickness of the photo-cured layer before and after being subjected to a baking treatment at 250° C. for 2 minutes.

In another aspect of the laminate, the photo-cured layer can have an Ohnishi number of the greater than 2.9.

In a further embodiment, a method of forming a photo-cured layer on a substrate, can comprise: applying a layer of a photocurable composition on the substrate, wherein the photocurable composition can comprise a photoinitiator and a polymerizable material. The polymerizable material may comprise 10 wt % to 30 wt % of a mono-functional acrylate monomer having a structure of formula (1), with R1 being H or $C_1$-$C_6$ alkyl; R2 and R3 being one or more substitutions of $C_1$-$C_{10}$ alkyl or alkyl-aryl; and R4, R5 being H or $C_1$-$C_{10}$ alkyl,

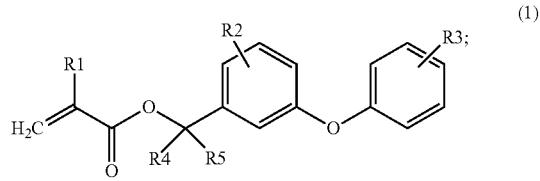

(1)

bringing the photocurable composition into contact with a superstrate; irradiating the photocurable composition with light to form a photo-cured layer; and removing the superstrate from the photo-cured layer.

In one aspect of the method, the photo-cured layer can have a thermal shrinkage of not greater than 7.5 percent, the thermal shrinkage being a difference in thickness of the photo-cured layer before and after being subjected to a baking treatment at 250° C. for 2 minutes.

In a further aspect of the method, the viscosity of the photocurable composition may be not greater than 15 mPa·s.

In a certain aspect of the method, the photocurable composition can further comprise bisphenol A dimethacrylate (BPADMA) in an amount of 10 wt % to 30 wt % based on the total weight of the polymerizable composition.

In another embodiment, a method of forming an article can comprise: applying a layer of a photocurable composition on a substrate, wherein the photocurable composition can comprise a photoinitiator and a polymerizable material, the polymerizable material comprising 10 wt % to 30 wt % of a mono-functional acrylate monomer having a structure of formula (1), with R1 being H or $C_1$-$C_6$ alkyl; R2 and R3 being one or more substitutions of $C_1$-$C_{10}$ alkyl or alkyl-aryl; and R4, R5 being H or $C_1$-$C_{10}$ alkyl,

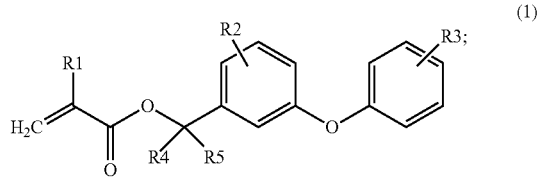

(1)

bringing the photocurable composition into contact with a superstrate; irradiating the photocurable composition with light to form a photo-cured layer; removing the superstrate from the photo-cured layer; forming a pattern on the substrate; processing the substrate on which the pattern has been formed in the forming; and manufacturing an article from the substrate processed in the processing.

DETAILED DESCRIPTION

The following description is provided to assist in understanding the teachings disclosed herein and will focus on specific implementations and embodiments of the teachings. This focus is provided to assist in describing the teachings and should not be interpreted as a limitation on the scope or applicability of the teachings.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the imprint and lithography arts.

As used herein, the terms "comprises," "comprising." "includes." "including," "has." "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein, and unless expressly stated to the contrary. "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The present disclosure is directed to a photocurable composition comprising a photoinitiator and a polymerizable material, wherein the polymerizable material can include a mono-functional acrylate monomer having a structure of formula (1), with R1 being H or $C_1$-$C_6$ alkyl, and R2 and R3 being one or more substitutions of $C_1$-$C_{10}$ alkyl or alkyl-aryl, and R4, R5 being H or $C_1$-$C_{10}$ alkyl,

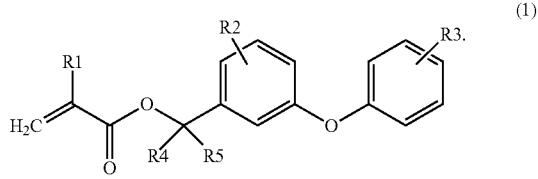

(1)

In a particular aspect, the mono-functional acrylate monomer can have the structure of formula (2), with R1 being H or $CH_3$.

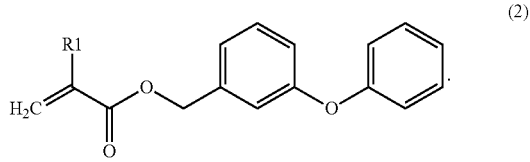

(2)

It has been surprisingly observed that certain combinations of the monomer of formula (1) with a multi-functional acrylate monomer can lead to photocurable compositions having a low thermal shrinkage after curing. In one aspect, the thermal shrinkage of a photo-cured layer formed from the photocurable composition, when subjected to a baking treatment at 250° C. for 2 minutes, can be not greater than 7.5%, such as not greater than 7.2%, not greater than 7.0%, not greater than 6.8%, not greater than 6.5%, not greater than 6.3%, or not greater than 6.0%. As used herein, the thermal shrinkage is calculated as the % difference in height of the photo-cured layer before and after the baking treatment.

In one aspect, the multi-functional acrylate monomer of the polymerizable material can be a bi-functional acrylate monomer, a tri-functional acrylate monomer, a tetra-functional acrylate monomer, or any combination thereof. Non-limiting examples of multi-functional acrylate monomers can be bisphenol A dimethacrylate, neopentyl glycol diacrylate, trimethylolpropane triacrylate, tetramethylolmethane tetraacrylate, or any combination thereof.

In a particular aspect, the multi-functional acrylate monomer can be a bi-functional acrylate monomer. In a certain particular aspect, the bi-functional acrylate monomer can be bisphenol A dimethacrylate, which has the structure shown in formula (3):

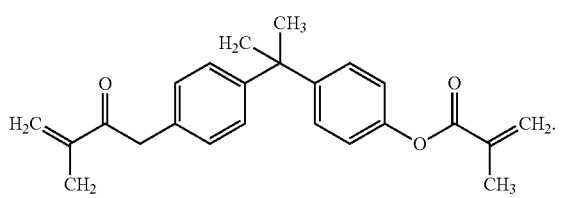

(3)

In one aspect, the amount of the mono-functional acrylate monomer of formula (1) can be at least 10 wt % based on the total weight of the polymerizable material, such as at least 15 wt %, or at least 20 wt %. In another certain aspect, the amount of the monomer of formula (1) may be not greater than 40 wt %, or not greater than 30 wt %, or not greater than 25 wt %, or not greater than 20 wt %, or not greater than 15 wt %, or not greater than 12 wt %, or not greater than 10 wt % based on the total weight of the polymerizable material. The amount of the monomer of formula (1) can be a number within a range between any of the minimum and maximum numbers noted above.

In another aspect, the amount of the multi-functional acrylate monomer can be at least 10 wt %, or at least 15 wt %, or at least 20 wt %, or at least 25 wt % based on the total weight of the polymerizable material. In another aspect, the amount of the multi-functional acrylate monomer may be not greater than 50 wt % based on the total weight of the polymerizable material, such as not greater than 40 wt %, not greater than 30 wt %, not greater than 25 wt %, or not greater than 20 wt %. The amount of the multifunctional acrylate monomer can be a number within any of the minimum and maximum numbers noted above, such as from 10 wt % to 50 wt %, from 15 wt % to 40 wt %, or from 10 wt % to 30 wt %.

In yet a further aspect, a weight % ratio of the mono-functional monomer of formula (1) to the multi-functional acrylate monomer can be from 1:5 to 5:1, such as from 1:3 to 3:1, or from 1:1 to 3:1.

Important for the selection of monomers is the aspect of maintaining a low viscosity of the polymerizable composition before curing. In one embodiment, the viscosity of the curable composition can be not greater than 30 mPa·s, such as not greater than 25 mPa·s, not greater than 20 mPa·s, not greater than 15 mPa·s, or not greater than 10 mPa·s. In other certain embodiments, the viscosity may be at least 3 mPa·s, such as at least 5 mPa·s, or at least 8 mPa·s. In a particularly preferred aspect, the photocurable composition can have a viscosity of not greater than 15 mPa·s. As used herein, all viscosity values relate to viscosities measured at a temperature of 23° C. with the Brookfield method using a Brookfield Viscometer.

The amount of polymerizable material in the photocurable composition can be at least 75 wt % based on the total weight of the photocurable composition, such as at least 80 wt %, at least 85 wt %, at least 90 wt %, or at least 95 wt %. In another aspect, the amount of polymerizable material may be not greater than 99 wt %, such as not greater than 98 wt %, or not greater than 97 wt %, or not greater than 95 wt % based on the total weight of the photocurable composition. The amount of polymerizable material can be a value between any of the minimum and maximum values noted above. In a particular aspect, the amount of the polymerizable material can be at least 85 wt % and not greater than 98 wt %.

In another embodiment, the polymerizable material of the photocurable composition can include to a certain amount polymerizable monomers, oligomers, or polymers in addition to the mono-functional acrylate monomer of formula (1) and the at least one multi-functional acrylate monomer. Non-limiting examples of such polymerizable compounds can be, for example, benzyl acrylate, 1-naphthyl acrylate, divinylbenzene, a maleimide monomer, a vinylether, or a styrene derivative.

In one aspect, the polymerizable material can comprise at least one further mono-functional acrylate monomer in addition to the mono-functional acrylate monomer of formula (1) and the multifunctional acrylate monomer, such as at least two or three additional mono-functional acrylate monomers. In a particular aspect, an amount of the at last one additional mono-functional acrylate monomer can be at least 30 wt %, or at least 40 wt %, or at least 50 wt %, or at least 60 wt % based on the total weight of the polymerizable material. In a certain particular aspect, the polymerizable material can comprise as an additional mono-functional acrylate monomer benzyl acrylate in an amount of at least 40 wt %.

In a further aspect, the curable composition of the present disclosure may be free of a solvent.

In order to initiate the photocuring of the composition if exposed to light, one or more photoinitiators can be included in the photocurable composition.

In a certain aspect, the curing can be also conducted by a combination of light and heat curing.

The photocurable composition can further contain one or more optional additives. Non-limiting examples of optional additives can be stabilizers, dispersants, solvents, surfactants, inhibitors or any combination thereof.

In one embodiment, the photocurable composition can be applied on a substrate to form a photo-cured layer. As used herein, the combination of substrate and photo-cured layer overlying the substrate is called a laminate.

The combination of monomers of the polymerizable material can lead to a high carbon content in the photo-cured layer. In one embodiment, the carbon content of the photo-cured layer can be at least 70%, such as at least 72%, at least 73%, at least 74%, at least 75%, at least 76%, or at least 77%. In a particular aspect, the carbon content may be at least 74%.

In another aspect, the photo-cured layer of the laminate can have an Ohnishi number of not greater than 2.9, or not greater than 2.8, or not greater than 2.7, or not greater than 2.6. In another aspect, the Ohnishi number may be at least 1.8, such as at least 1.9, at least 2.0, at least 2.1, at least 2.2, or at least 2.3.

In a particular embodiment, the photo-cured layer can have a carbon content of at least 74% and an Ohnishi number of not greater than 2.9.

The present disclosure is further directed to a method of forming a photo-cured layer. The method can comprise applying a layer of the photocurable composition described above over a substrate, bringing the photocurable composition into contact with a template or superstrate; irradiating the photocurable composition with light to form a photo-cured layer, and removing the template or the superstrate from the photo-cured layer.

The substrate and the solidified layer may be subjected to additional processing, for example, an etching process, to transfer an image into the substrate that corresponds to the pattern in one or both of the solidified layer and/or patterned layers that are underneath the solidified layer. The substrate can be further subjected to known steps and processes for device (article) fabrication, including, for example, curing, oxidation, layer formation, deposition, doping, planarization, etching, formable material removal, dicing, bonding, and packaging, and the like.

The photo-cured layer may be further used as an interlayer insulating film of a semiconductor device, such as LSI, system LSI, DRAM, SDRAM, RDRAM, or D-RDRAM, or as a resist film used in a semiconductor manufacturing process.

As further demonstrated in the examples, it has been surprisingly discovered that a certain combinations of polymerizable monomers containing a mono-functional acrylate monomer of formula (1) and at least one second monomer including a multi-functional acrylate monomer in a photocurable composition can have very suitable properties especially for IAP processing. The photocurable composition of the present disclosure can have a desired low viscosity of less than 15 mPa·s and can form photo-cured layers low thermal shrinkage if exposed to a high temperature baking treatment.

EXAMPLES

The following non-limiting examples illustrate the concepts as described herein.

Example 1

Preparing of Photocurable IAP Compositions.

Five photocurable compositions (samples S1 to S5) were prepared by combining for each sample the mono-functional acrylate monomer 3-phenoxybenzyl acrylate (POBA) with the bi-functional acrylate monomer biphenyl A dimethacrylate (BPADMA), and two further monomers selected from benzylacrylate (BA), 1-naphthylacrylate (1-NA), and orthophenylphenol EO acrylate (Miramer M1142 from Miwon Specialty Chemical Co., Ltd). The exact combination and amount of monomers of the polymerizable material for each composition is summarized in Table 1 below.

Furthermore, two comparable photocurable compositions were prepared by combining the bi-functional BPADMA with BA and 1-NA (comparable composition C1), and by combining BPADMA with BA, 1-NA and 1-adamantyl methacrylate (1-AMA) (comparable composition C2). The structure of 1-AMA is shown in formula (4).

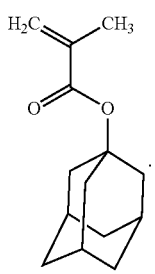

(4)

The polymerizable materials of the comparable compositions C1 and C2 are also summarized in Table 1. All photocurable compositions further contained as photoinitiator Irgacure 819 in an amount of 1-5 wt % and as surfactant C10GM2070 in an amount between 0.1%-3% wt %.

TABLE 1

| Sample | POBA | BPADMA | BA | 1-NA | M1142 | 1-AMA | Visc. [Cp] |
|---|---|---|---|---|---|---|---|
| S1 | 20 | 20 | 50 | 10 | | | 8.69 |
| S2 | 20 | 20 | 50 | | 10 | | 9.55 |
| S3 | 10 | 20 | 50 | 20 | | | 8.90 |
| S4 | 30 | 20 | 50 | | | | 8.37 |
| S5 | 40 | 20 | 40 | | | | 10.98 |
| C1 | | 20 | 50 | 30 | | | 8.10 |
| C2 | | 20 | 50 | 15 | | 15 | 8.29 |

Photo-cured layers were prepared from the photocurable compositions summarized in Table 1 by applying a liquid film of the photocurable composition of about 300 microns thickness on a glass substrate, and subjecting the liquid film to a UV light intensity of 4 mW/cm² for 600 s seconds, which corresponds to a curing energy dosage of 2.4 J/cm². After the photo-curing, all photo-cured layers were solid.

Measuring the Thermal Shrinkage

In order to evaluate the thermal shrinkage, the photo-cured layers were placed after the photo-curing on a hotplate having a temperature of 250° C. for two minutes, which is also called herein baking. All baking treatments were conducted under air. The thermal shrinkage was obtained by measuring the change in thickness of the tested layers before and after the baking treatment using an ellipsometer, and calculating the thermal shrinkage (St) according to the formula: $St=(T_u-T_b)/T_u$, with $T_u$ being the thickness of the layer in an unbaked stage before the baking, $T_b$ being the thickness of the layer after baking.

Table 2 summarizes the results of the thermal shrinkage testing for all samples. Table 2 further contains the calculated weight % of the carbon content and the Ohnishi numbers of the layers. It can be seen that samples S1 to S5 had between about 1 to 3 percent lower thermal shrinkage than comparative samples C1 and C2.

TABLE 2

| Sample | Thermal Shrinkage during baking at 250° C. [%] | Carbon content [%] | Ohnishi No. |
|---|---|---|---|
| S1 | 6.43 | 75.20 | 2.65 |
| S2 | 6.68 | 74.89 | 2.72 |
| S3 | 7.09 | 75.51 | 2.62 |
| S4 | 6.02 | 74.89 | 2.67 |
| S5 | 5.32 | 75.05 | 2.65 |
| C1 | 8.09 | 75.82 | 2.59 |
| C2 | 7.96 | 75.45 | 2.70 |

The viscosities of the samples were measured at 23° C., using a Brookfield Viscometer LVDV-II+Pro at 200 rpm, with a spindle size #18. For the viscosity testing, about 6-7 mL of sample liquid was added into the sample chamber, enough to cover the spindle head. For all viscosity testing, at least three measurements were conducted and an average value was calculated.

The Ohnishi number (ON) is known to be an empirical parameter and calculated as the ratio of total number of atoms ($N_t$) in the polymer repeat unit divided by the difference between the number of carbon atoms ($N_C$) and oxygen atoms ($N_O$) in the unit, $ON=N_t/(N_C-N_O)$. For the calculation of the Ohnishi number, it was assumed that the cured materials contained 100 wt % of the polymerized monomer units formed by addition polymerization (no loss of atoms during polymerizations).

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A photocurable composition comprising a photoinitiator and a polymerizable material, wherein
the polymerizable material comprises a mono-functional acrylate monomer having a structure of formula (1), with R1 being H or $C_1$-$C_6$ alkyl, and R2 and R3 being one or more substitutions of $C_1$-$C_{10}$ alkyl or alkyl-aryl, and R4, R5 being H or $C_1$-$C_{10}$ alkyl,

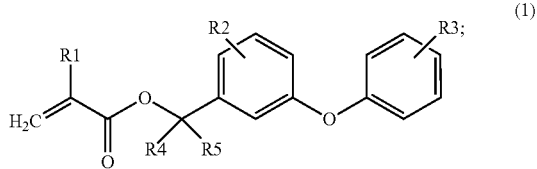

(1)

an amount of the acrylate monomer of formula (1) is at least 10 wt % and not greater than 40 wt % based on the total weight of the polymerizable material; and
a carbon content of a photo-cured layer of the photocurable composition is at least 74%.

2. The photocurable composition of claim 1, wherein the polymerizable material further comprises at least one multi-functional acrylate monomer.

3. The photocurable composition of claim 2, wherein the at least one multi-functional acrylate monomer includes a bi-functional acrylate monomer, a tri-functional acrylate monomer, a tetra-functional acrylate monomer, or any combination thereof.

4. The photocurable composition of claim 3, wherein the at least one multi-functional acrylate monomer includes bisphenol A dimethacrylate (BPADMA).

5. The photocurable composition of claim 3, wherein an amount of the multi-functional acrylate monomer is at least 10 wt % and not greater than 40 wt % based on the total weight of the polymerizable material.

6. The photocurable composition of claim 1, wherein the mono-functional acrylate monomer has a structure of formula (2), with R1 being H or $CH_3$:

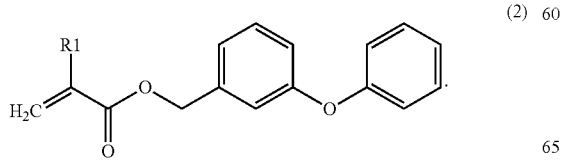

(2)

7. The photocurable composition of claim 6, wherein an amount of the mono-functional acrylate monomer is at least 10 wt % and not greater than 25 wt % based on the total weight of the polymerizable material.

8. The photocurable composition of claim 6, wherein an amount of the mono-functional acrylate monomer is at least 10 wt % and not greater than 15 wt % based on the total weight of the polymerizable material.

9. The photocurable composition of claim 1, wherein the polymerizable material further comprises at least one mono-functional acrylate monomer different than the mono-functional acrylate monomer of formula 1.

10. The photocurable composition of claim 1, wherein the photocurable composition is adapted that a photo-cured layer of the composition has a thermal shrinkage of not greater than 7.5 percent, the thermal shrinkage being a difference in thickness of the photo-cured layer before and after being subjected to a baking treatment at 250° C. for 2 minutes.

11. The photocurable composition of claim 1, wherein a viscosity at 23° C. of the photocurable composition is not greater than 15 mPa·s.

12. The photocurable composition of claim 1, wherein the photocurable composition is adapted that a photo-cured layer of the composition has an Ohnishi number not greater than 2.9.

13. A laminate comprising a substrate and a photo-cured layer overlying the substrate, wherein the photo-cured layer is formed from the photocurable composition of claim 1.

14. The laminate of claim 13, wherein the photo-cured layer has a thermal shrinkage of not greater than 7.5 percent, the thermal shrinkage being a difference in thickness of the photo-cured layer before and after being subjected to a baking treatment at 250° C. for 2 minutes.

15. The laminate of claim 13, wherein the photo-cured layer has an Ohnishi number of not greater than 2.9.

16. A method of forming a photo-cured layer on a substrate, comprising:
applying a layer of a photocurable composition on the substrate, wherein the photocurable composition comprises a photoinitiator and a polymerizable material, the polymerizable material comprising 10 wt % to 40 wt % of a mono-functional acrylate monomer having a structure of formula (1), with R1 being H or $C_1$-$C_6$ alkyl; R2 and R3 being one or more substitutions of $C_1$-$C_{10}$ alkyl or alkyl-aryl; and R4, R5 being H or $C_1$-$C_{10}$ alkyl,

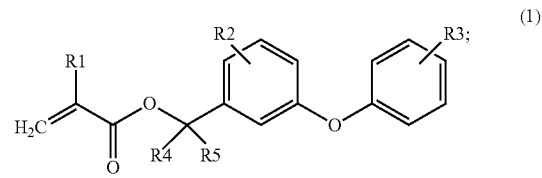

(1)

bringing the photocurable composition into contact with a superstrate;
irradiating the photocurable composition with light to form a photo-cured layer; and
removing the superstrate from the photo-cured layer.

17. The method of claim 16, wherein the photo-cured layer has a thermal shrinkage of not greater than 7.5 percent, the thermal shrinkage being a difference in thickness of the photo-cured layer before and after being subjected to a baking treatment at 250° C. for 2 minutes.

18. The method of claim 16, wherein a viscosity at 23° C. of the photocurable composition is not greater than 15 mPa·s.

19. The method of claim 16, wherein the photocurable composition further comprises bisphenol A dimethacrylate (BPADMA) in an amount of 10 wt % to 30 wt % based on the total weight of the polymerizable composition.

20. A method of forming an article, comprising:
applying a layer of a photocurable composition on a substrate, wherein the photocurable composition comprises a photoinitiator and a polymerizable material, the polymerizable material comprising 10 wt % to 40 wt % of a mono-functional acrylate monomer having a structure of formula (1), with $R_1$ being H or $C_1$-$C_6$ alkyl; $R_2$ and $R_3$ being one or more substitutions of $C_1$-$C_{10}$ alkyl or alkyl-aryl; and $R_4$, $R_5$ being H or $C_1$-$C_{10}$ alkyl,

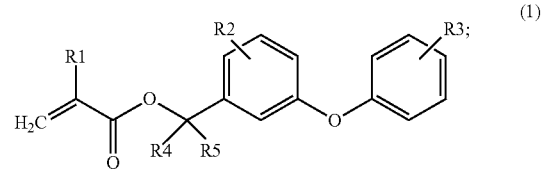

bringing the photocurable composition into contact with a superstrate;
irradiating the photocurable composition with light to form a photo-cured layer;
removing the superstrate from the photo-cured layer;
forming a pattern on the substrate;
processing the substrate on which the pattern has been formed in the forming; and
manufacturing an article from the substrate processed in the processing.

\* \* \* \* \*